United States Patent [19]

Fudger

[11] Patent Number: 5,771,634
[45] Date of Patent: Jun. 30, 1998

[54] HYDROPONIC CONTROL APPARATUS

[76] Inventor: Michael Edward Fudger, 242 King St. Box 507, Harriston, Ont, Canada, N0G 1Z0

[21] Appl. No.: 615,315

[22] PCT Filed: Sep. 16, 1994

[86] PCT No.: PCT/CA94/00487

§ 371 Date: Jun. 20, 1996

§ 102(e) Date: Jun. 20, 1996

[87] PCT Pub. No.: WO95/08260

PCT Pub. Date: Mar. 30, 1995

[30] Foreign Application Priority Data

Sep. 20, 1993 [GB] United Kingdom ............ 9323751

[51] Int. Cl.[6] .................................................. A01G 31/00
[52] U.S. Cl. .................................................. 47/62; 47/59
[58] Field of Search .................... 47/59, 62, 79, 47/1.01, 14

[56] References Cited

U.S. PATENT DOCUMENTS

| 3,807,088 | 4/1974 | Jones | 47/62 N |
| 4,015,366 | 4/1977 | Hall | 47/1.01 |
| 5,184,420 | 2/1993 | Papadopoulos | 47/62 N |
| 5,212,906 | 5/1993 | Okuno | 47/62 N |

*Primary Examiner*—Michael J. Carone
*Assistant Examiner*—Robert Pezzuto
*Attorney, Agent, or Firm*—Anthony Asquith & Co.

[57] ABSTRACT

A small (e.g. in home) hydroponic installation is controlled by a computer. The computer controls the on/off status of the outputs such as the lights, fan, water pump etc. Corresponding sensors feed data and readings into the computer. The basis operation is carried out by stepping through the outputs and the corresponding sensors. An LCD displays the parameters one at a time, in sequence. A keyboard is provided for entering settings.

6 Claims, 3 Drawing Sheets

HYDROPONIC CONTROL APPARATUS

This invention relates to hydroponic cultivation, and relates especially to the control of the various electrical parameters used in hydroponic installations,

BACKGROUND OF THE INVENTION

Hydroponic cultivation of the kind to which the invention relates is carried out in an indoor Installation, under controlled conditions of temperature, humidity, and so on. The growing plants are set in nutrient-controlled water, and their growth is promoted by electric lights.

Hydroponic cultivation has been considered hitherto to be somewhat unsuitable for the amateur operator. It is not common to find an installation in, for example, a domestic house. However, the reason for this low acceptability of in-home hydroponic installations is not cost, particularly; rather, the problem is perceived to lie more with the amount of attention required of the amateur operator, and with the level of skill and judgement needed.

Thus, the problem is perceived to be that the amateur will have difficulty in co-ordinating the thermostats, the light-on-light-off cycle, the carbon dioxide monitor, the nutrient acidity sensor, and all the rest, on a day-by-day basis.

It is now recognised that amateur operators can perfectly easily acquire the skills needed to operate an in-home hydroponic facility, provided the controls of the facility are directed, not by constant manual attention from the operator, but to a large extent by sensors, a computer, and programmed operational sequences.

The invention lies in a control apparatus which is highly suitable for household or domestic hydroponic installations. The apparatus of the invention is suitable for in-home installations, not only on operational grounds, but also on the grounds of cost, and on the grounds of the level of complexity needed for the number of parameters of operation found in a typical small hydroponic system. Of course, a conventional computer (ie a typical computer of the kind that has eg 1 Mb of RAM, display screen, keyboard, etc) could be programmed to operate the hydroponic facility. However, that would not be desirable: the computer would have to be dedicated to that use, which would be far too expensive. Besides, the amateur may not be familiar with computer programming and operation.

In a commercial hydroponic installation, with many growing rooms, with many employees who are paid to take care of the mundane chores, the economics are different, and it is worthwhile to dedicate even expensive equipment for controlling the process. Thus, sophisticated computerised control systems are commonly to be found in conventional commercial hydroponic installations.

The invention is aimed at a system which is inexpensive enough that it can be dedicated for use in an in-home hydroponic facility, and which is easy to operate even by a person with no knowledge of computer programming or operation.

Of course, small, domestic hydroponic installations do exist at present. However, installations of the present designs are invariably controlled to a huge degree not by computers and automatic programs but by the constant personal attention of the human operator. It is this large amount of skilled attention required that is perceived as the barrier to in-home hydroponic installations becoming more widespread.

The lights, pumps, control components, etc, of the hydroponic installation are all electrical. The conventional practice is to provide the usual several instruments or sensors, eg pH meter, max-min thermometer, and the rest: the operator uses his knowledge and skilled judgement to adjust the light cycle, the humidity, the CO2 content, etc. In practice, the operator checks the readings and settings, then leaves the installation for a while; then he keeps coming back, adjusting the controls, and again repeating the mundane tasks.

It is recognised that what is required is an all-in-one controller device, with a timer and a computer, to which the operator can plug-in all the sensor inputs, and plug-in all the powered outputs, whereby he can leave the system, once set, to operate automatically. With the use of the device, the operator can let his settings of the timer and input sensors do the mundane work, and control the outputs. Equally, relieving the operator of the mundane operation, and yet ensuring that the operational steps are carried out systematically and thoroughly, means that the operator is now freed to put his knowledge and enthusiasm into the really interesting part of hydroponic cultivation, namely into trying out new programs with a view to improving yield, growth speed, etc.

By comparison, conventional amateur horticulture (ie gardening) can be a pleasurable hobby even as regards the mundane chores, such as digging, planting, weeding, etc. This is much less true of amateur hydroponic cultivation, in that the mundane chores comprise, mainly, of such things as checking thermostats and pushing switches. The interest of hydroponics, to the amateur, lies more in the experimentation that can be done, and it is in this area that the invention is useful. The invention relieves the operator of the mundane chores, and yet ensures that those chores are done consistently. The invention allows the operator to set and adjust the parameters according to his own ideas, and to know that his settings will be followed automatically, without the need for constant attention.

DETAILED DESCRIPTION OF PREFERRED EMBODIMENT

By way of explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
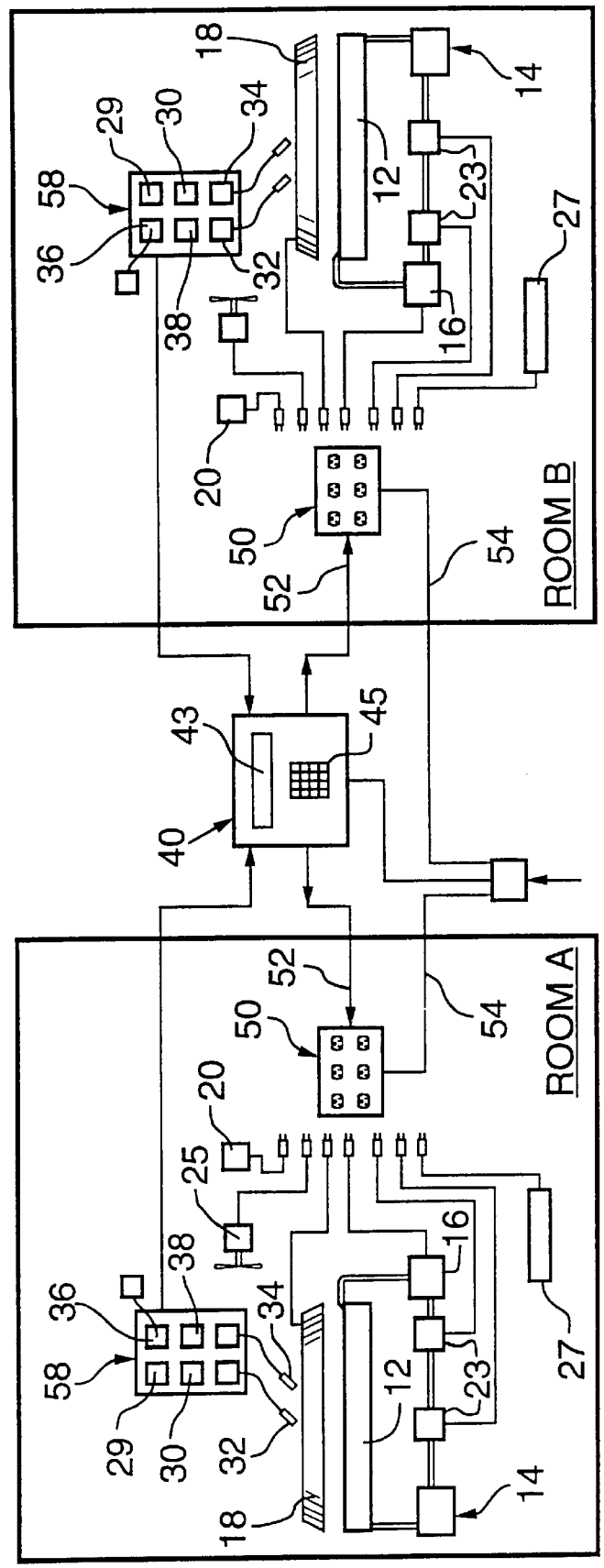
FIG. 1 is a diagrammatic elevation of a hydroponic cultivation operation, in which the operational parameters are under the control of a control apparatus which embodies the invention.
Figure 2:
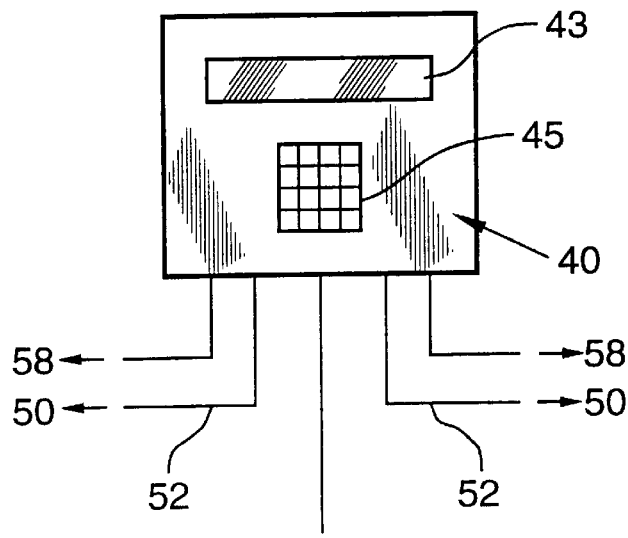
FIG. 2 is an elevation of a control box of the apparatus shown in FIG. 1.

FIG. 1 shows a hydroponic cultivation operation, of the usual kind, in which two rooms A and B are controlled independently as to lighting, temperature, humidity, etc. In room A seeds develop into seedlings, and in room B the seedlings grow into mature plants.

In each room, there are the usual troughs 12 of nutrient-bearing water, with the associated tanks, float-valves, drains, recirculation piping, and other passive (ie not powered) components, (designated collectively under reference numeral 14) and powered by electrical pumps and valves 16. Positioned above the troughs are the usual electric lights 18. The hydroponic system also includes the usual carbon dioxide source 20, and includes conventional means 23 for correcting the nutrient qualities, pH, etc, of the water in the troughs.

Often, in a domestic installation, the heat from the lights 18 is sufficient to keep the rooms warm enough. Often, the rooms can be kept cool enough by the use of a simple air-extraction fan 25. However, heaters, and/or coolers 27, as separate electrical items, may be present in some cases, especially in areas with extremes of climate. (Hydroponic rooms generally are well insulated thermally.)

Each room is equipped also with the usual (electrical) sensors. These include an air-temperature sensor 29, a humidity sensor 30, a water-pH sensor 32, a water-EC sensor 34, and a CO2-content sensor 36. The room may also be equipped with a light sensors 38. All the sensors 29,30, 32,34,36,38 feed, at least indirectly, into a control box 40.

The control box 40 is fitted with a visual display unit 43, which in this case comprises a forty-character liquid-crystal display unit of proprietary design. The control box 40 also is fitted with an input device which permits the operator manually to enter numbers, settings, etc, and which in this case comprises a twelve-key keyboard unit 45.

The control box 40 is also fitted with a clock or timer 47, and a computer 49.

The signals received from the sensors 29,30,32,34,36,38, from the clock 47, and from the keyboard 45, are acted upon by the computer 49. The computer then issues commands to the electrically-powered elements 14,16,18,20,23,25,27, whereby the elements are switched on and off at appropriate times and sequences.

The several outputs from the computer are in the form of simple on/off electrical signals. These signals pass to relays through which power is actually fed to the elements 14,16, 18,20,23,25,27. The relays may be of the electromechanical type, or of the electronic type.

Figure 3:
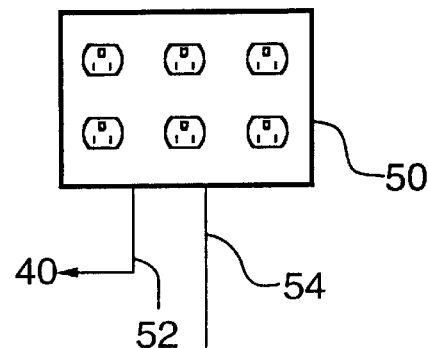
FIG. 3 is an elevation of a relay box of the apparatus shown in FIG. 1.

The relays are housed in a relay box 50. In the relay box (see FIG. 3) the on/off control signals from the computer are transmitted to the relay box through a cable 52; the relay box receives mains power via cable 54; and transmits power to the elements 14,16,18,20,23,25,27, via the several cables connected to the elements, the on/off settings of the relays being dictated by the outputs from the computer.

Figure 3A:
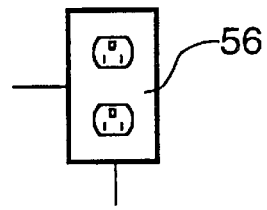
FIG. 3A is an elevation of a slave relay box of the apparatus shown in FIG. 1.
Figure 4:
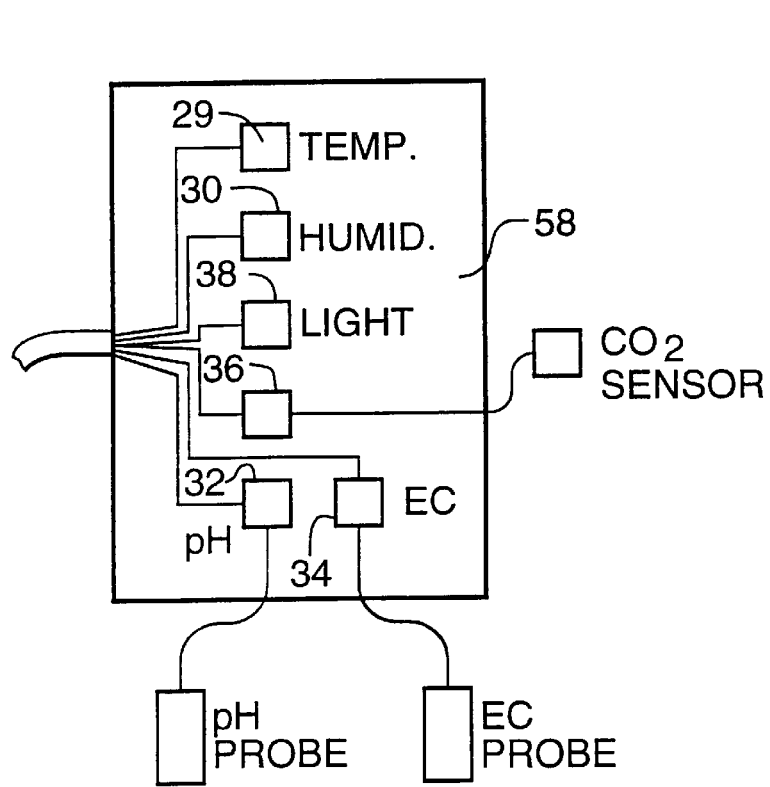
FIG. 4 is an elevation of a sensor box of the apparatus shown in FIG. 1.
Figure 5:
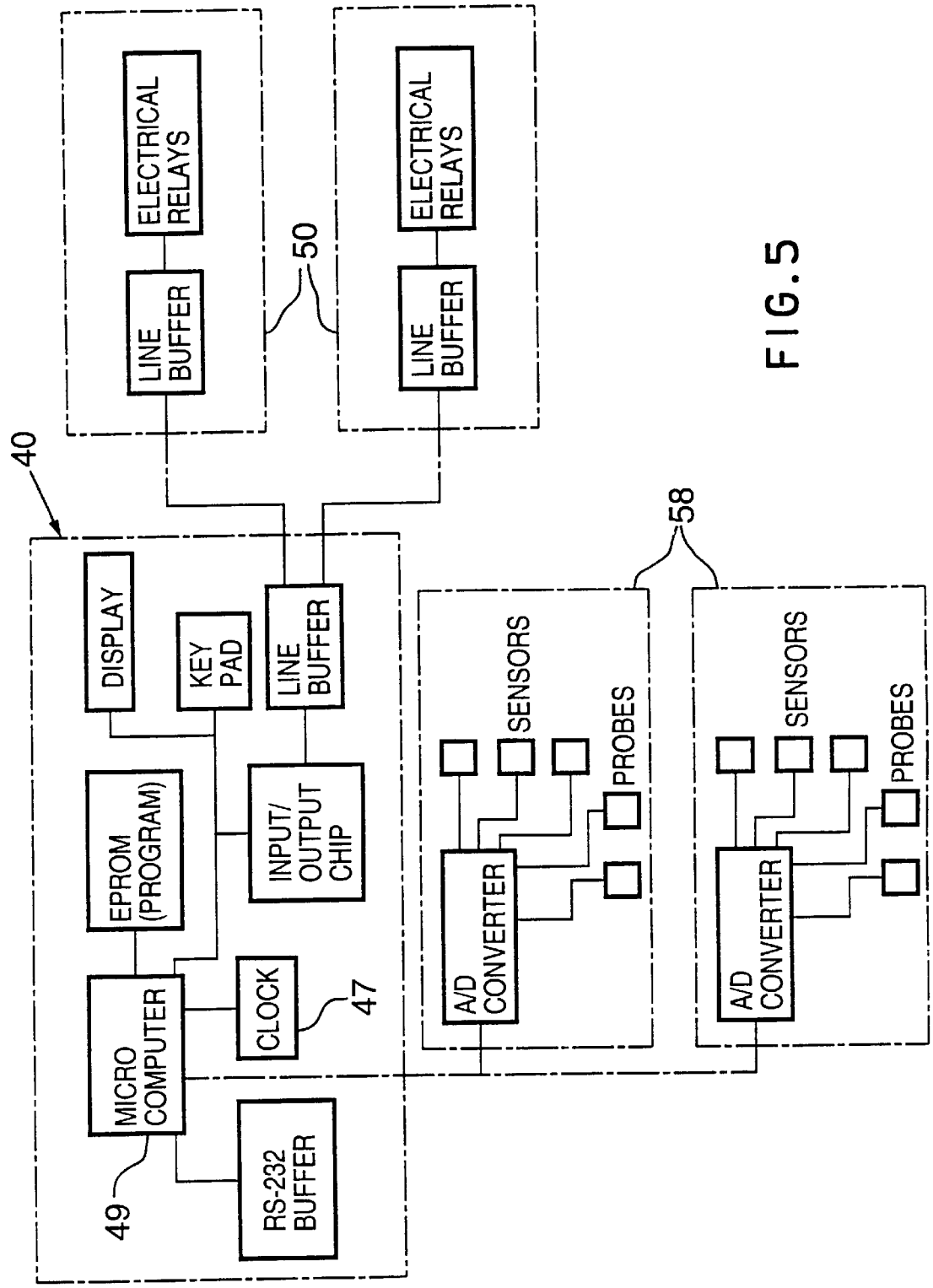
FIG. 5 is a block diagram of a computer system, which is a component of the apparatus shown in FIG. 1.

In the case of a domestic hydroponic installation, it usually turns out that all the electrical current needed to power the installation can be derived from a single mains power point, ie the total current draw is less than 15 amps (at 120 VAC). The electric lights account for most of this current. In a case where more light, and more amperage, is required, ie where the power handling capacity of the relay box 50 may not be enough to handle the electrical loads, a slave relay box 56 (see FIG. 3A) can be provided, which is connected in parallel with the lights-circuits in the main relay box 50, and controls the supply of power to the extra lights from another 15 amp source.

A sensor box 58 is provided, and the electrical leads from the sensors 29,30,32,34,36,38 are arranged to be connected thereto. Those of the sensors which require a (usually, low-voltage DC) power supply are fed from an appropriate power supply unit which can be located in the sensor box.

Some types of sensor may require pre-conditioning of the electrical signals therefrom (eg matching of impedances, etc) before passing to the control box 40, and this can be carried out in the sensor box 58. The signals have to pass through an A-to-D converter in order to be processed by the computer 49, and this can be done also inside the sensor box.

Those sensors which monitor conditions in the room generally, such as the air-temperature sensor 29 and the humidity sensor 30, are housed directly in the sensor box 58, and accordingly provision is made for the air in the room to circulate through the sensor box. The light sensor 38 also is provided in the sensor box. The pH and EC sensors 32,34 are remote from the sensor box, and are connected thereto by plug-in cables.

The display unit 43, the keyboard 45, and their manner of use, will now be described.

In a first manner of operation, the operator enters on the timer the settings of the various switched output elements 14,16,18,20,23,25,27. That is to say, all the outputs are controlled by the timer. For example, not only are the lights 18 set to come on for eighteen hours of the day, but the CO2 source 20 is set to admit CO2 for thirty minutes per day. The sensors are not used directly, in this case, to control the outputs, but rather the system is set to give read-outs of the maximum and minimum values of the sensor signals that occur over the day. The operator reviews the max/min readings from the sensors; then, he can adjust the timing of the switched outputs depending on what the readings indicate. In this first manner of operation, the sensors do not directly control the outputs—the timer does that—but rather the sensors inform the operator whether he should make any changes to the timed sequences of the output switches.

In order to set the various time sequences and cycles, the operator uses the keyboard 45 and display 43 to step through the different output elements. The outputs are programmed to appear on the display in a certain order. Thus, after selecting the Set-Point mode, the operator is presented with a display which reads Lights On Start Time?. He uses the keyboard to enter a suitable start time. Having set the lights-on start time and duration, he is next presented with Number Of Watering Cycles Per Day?, then Start Time Of First Watering?, and Number Of Minutes Watering Pump Is On?, etc. All of these questions are answered by typing in the appropriate numbers from the keyboard.

As mentioned, in this first manner of operation, the timer directly controls all the outputs. The sensors are just used for recording and indicating purposes, not for direct control.

In a second manner of operation, the timer again controls some of the outputs, but others of the outputs are controlled directly by the appropriate sensors. Thus, the operator still sets the lights-on/lights-off cycle by means of the timer; but the fans or other heat control device are operated not by the timer but by the temperature sensor 29. In this second manner of operation, as the operator steps through the different outputs, the questions appearing on the display include Maximum Temperature Set-Point? as distinct from straight timing settings.

In this second manner of operation, the manner in which the sensors interact with the outputs is pre-programmed. For example, the unit may be programmed to link together the fan 25 and the CO2 source 20. The fan runs in order to cool the room; the fan drives the hot, moist air out, and draws relatively cool, dry, fresh air in. After the fan has been running, and the room has cooled, the CO2 content of the room will therefore have become depleted by the incoming fresh air.

The CO2 sensor determines whether CO2 should be added. If so, the computer turns on the CO2 source for a period of, say thirty minutes, and during that time the computer disables the exhaust fan. After 30 minutes, the fan is again enabled. If more CO2 is needed, it will be added in another thirty minute burst, with the fan disabled, next time the fan is run.

This manner of operating, ie linking the CO2 sensor to the timing of the fan, is often preferable to leaving the CO2 content to be determined just by the CO2 sensor alone, since changes in CO2 content can take some time to be reflected in the CO2 sensor signals.

With the control system as described, the preprogramming required to link sensors and operations together in this manner can be very easily be put into effect.

If the operator requires more flexibility, again that can be arranged using the step-through system as described. In the third manner of operation, as before each output comes up in turn for setting as the operator steps through the outputs. But in respect of each output, the operator now steps through each input sensor, whereby he can set the values of each sensor to the levels he desires in order to control that output element. For example, he can set the fan to come on when the humidity rises above eighty-five percent, and he can independently set the fan to come on when the temperature rises above eighty degrees.

The program determines which sensors or inputs are presented to the operator in respect of each output. In the first manner of operation, just the timer is presented for setting in respect of each output. In the second manner of operation, some of the sensors are programmed to interact, although the interaction is pre-programmed, and the manner of interaction is not under the set-able control of the operator. In the third manner of operation, virtually any sensor can be used to control any output, although pre-programming can be used to eliminate obvious nonsense, such as having the temperature controlled by the pH sensor.

These three manners of operation can be pre-programmed into the computer, so that any of the pre-programmed manners of operation can be called up. The operator chooses which manner he wants. If he chooses timer-only, he will be presented with just the timer settings as he steps through the outputs.

Of course, the three manners of operation as described are just examples; the factor that permits the easy access to whatever manners of operation are programmed into the computer is that the display and the keyboard are arranged to step through the various outputs, enabling the operator to set the sensors and other inputs appropriate to that output, by the use of the keyboard. Conversely, it may be regarded that it is the fact of being able to step through the outputs that makes it worthwhile making available a number of pre-programmed manners of operation.

Calibration of the various sensors can be carried out by programming the system, again, to step through the various sensors. Generally, for calibrating, the sensor is placed in two separated conditions. The computer can then interpolate and extrapolate the other points in the range.

The two calibration points may be set in two different modes. In the first mode of calibrating say the temperature sensor, the computer assumes what the two conditions will be: thus the display sends first a message Is Temp Sensor Immersed In Boiling Water? (Y=1/N=0) Upon answer 1 the program calibrates that signal from the sensor to read 100 degC. on the display. The freezing point is set in a similar way, and the points in between then follow by computer-calculated interpolation.

Alternatively, a second mode of calibrating the temperature sensor would be to use any two temperature reference points. The two points would be derived from a separate thermometer placed adjacent to the sensor (in a hydroponic installation it is usual to provide a back-up thermometer). Now, the display would request, for instance: Is Temp Sensor at First Set-Point Temperature? (Y=1/N=0). Upon receiving 1, the next display would be Enter First Temperature, which the operator would immediately do. Then, some time later (when the temperature had changed), the display would run through the same procedure with respect to the second temperature set-point. Again, once the computer has two set points to work from, it can interpolate and extrapolate the other points in the range.

Calibrating the pH sensor can be done in either of the two modes also; that is to say, in the first mode the sensor is immersed in sequence in two different buffer liquids, the pH of which is pre-determined, and programmed-in. In the second mode, a separate independent pH-indicator is used to determine the two pH set-points.

Both calibration modes can be programmed into the computer, and the operator can select which mode. In either mode, he proceeds to calibrate all the sensors, again by the simple process of stepping them through, one-at-a-time, using the keyboard and the display.

During routine operation of the hydroponic system, when the operator is not present, the computer steps through the output elements and the input sensors in sequence, which may be more or less the same sequence as that obtaining when the operator was setting the parameters.

Consider, for example, the case where several of the sensors are being used to turn the fan on/off. The computer, in stepping through the output elements, comes periodically to "Fan". Now, whilst remaining on "fan", the computer steps through the appropriate ones of the sensors, ie those of the sensors that the operator entered to be considered by the computer in determining the on/off status of the fan. The computer steps through these sensors in turn, and changes the fan on/off status if any one of the sensors so require it.

The computer then moves onto the next output element, leaving the fan output in that just-set status. Upon completing the whole cycle of the outputs, the computer will then return to "fan"; again, the computer will step through the fan-appropriate sensors, and will update the on/off status.

Of course, there is no need, in hydroponic cultivation, for the computer to complete the cycle through all the output elements and input sensors rapidly. If the computer steps through a complete cycle every thirty minutes, that would generally be quite fast enough.

The visual display unit 43 is a forty-character LCD unit. During setting and adjustment by the operator, three things are required in respect of each step through the output elements: (1) that the particular output element (lights, fan, pump, etc) be identified; (2) that the display unit show the series of pre-programmed verbal messages (such as lights On Time?); and (3) that the display unit show the value of the reading or setting of the sensor, timer, etc. as appropriate. In appropriate cases, the display unit also should identify the sensor.

Five or six digits may be reserved for the reading or setting, another three or four digits for identifying the output element, another three or four again for identifying the sensor or input, and the remaining digits remain available for displaying the message.

Only one parameter is displayed on the unit 43 at one time. That is to say, when the display is showing the temperature setting at which the fan cuts in, the display does not (indeed, cannot) show anything else.

The total number of steps to be carried out in order to step right through the cycle of parameters will vary with each hydroponic installation—whether the installation includes heaters/coolers, whether the installation has reduced power lighting at some parts of the day, and so on. Typically, there will be between four and eight powered output elements, per room. Typically, there will be between five and ten sensors feeding input to the computer, per room, plus the timer. Some of the outputs will be under the control, as described, of as many as two or even three of the input sensors, but mostly each one of the outputs will be controlled by just one of the input sensors. Sometimes, it will be appropriate for the sensor to display both the current reading or status of the sensor, and the setting of the maw/min value or values of the sensor, at which the computer will act.

The readings preferably are always displayed sequentially, ie only one reading is displayed at one time. However, sometimes the display will have enough digits available, especially if the display message is kept short, for both the current reading and the max/min setting to be displayed at the same time, which is a convenience for the operator. It should be pointed out that although a larger display unit would permit more settings to be displayed simultaneously, if the display has more than about forty characters (digits), the simplicity and economy of the system of the invention, as described, would be lost.

In typical small hydroponic installations, therefore, the total number of parameters is in the region of twenty to thirty. That is to say: stepping through all the output elements, and stepping through all the sensors appropriate to each one of those output elements, will require a total number of steps in the region of between twenty and thirty.

It is recognised that this is just the sort of manageable number that can be handled by the procedure of stepping through. With a larger number of steps, the operator would start to lose track of where he has got to in the stepping sequence and the system becomes generally too cumbersome and unmanageable. With a much smaller number of steps, it would be as economical to provide separate sensors and elements, each with its own display, setting means, etc. In the prior art, for example, a simple thermostat was used to control the fan; one timer was used to control the lights, and another timer was used to control the CO2. When there are twenty or thirty such parameters, however, providing separate equipment for each is wasteful; the invention, by using the same visual display and the same keyboard for each parameter, avoids this uneconomical duplication.

It is recognised that in small hydroponic installations of the size and type likely to be selected for in-home use (and even for small commercial installations) a highly economical system for controlling the installation is to provide just one display unit, just one keyboard unit, and then to step through each output and sensor in turn.

It is also recognised that, by routing all the parameters through the one computer, more interactions can be created between the sensors and the outputs than when each was a separate entity.

The one-display—one-keyboard—step-through system as described is versatile and flexible as regards accommodating the different control requirements of even a creative operator; the system is reliable in the sense that the parameters are reproduced consistently and evenly, once set, and in the sense that the system should enjoy a long service life; and yet the economics of the system are entirely suitable for small hydroponic installations.

The apparatus shown in EP-0,142,989 is considered background art to the invention.

I claim:

1. Apparatus for controlling hydroponic cultivation, characterized in that the apparatus combines the following features:

the apparatus includes several electrical output elements;

one of the output elements is connected, in use of the apparatus to control the operation of a hydroponic cultivation facility, to an electric light unit of the facility;

the apparatus includes several electrical input elements, the input elements being capable, in use of the apparatus, of receiving input signals from respective independent sensors;

one of the input elements is so arranged as to receive, in use, an electrical signal from a sensor which senses the temperature of the hydroponic cultivation facility;

the apparatus includes a computer;

the apparatus includes means for conveying the signals from the sensors into the computer, and the computer is effective to receive said signals;

the apparatus includes a timer or clock, which is effective to produce electrical time signals, and the apparatus includes means for conveying the signals from the clock into the computer, and the computer is effective to receive said signals;

the apparatus includes a manual input device, which is effective to produce electrical signals corresponding to manual manipulations of the device, and the apparatus includes means for conveying the signals from the manual input device into the computer, and the computer is effective to receive said signals;

the apparatus includes respective control switches, one for each output element, for setting the on/off status of the respective output elements;

the computer is effective, in accordance with a predetermined program, and in response to the signals from the sensors, signals from the clock, and signals from the manual input device, to operate the control switches, whereby the computer is effective to control independently the on/off status of the output elements;

the apparatus includes a visual display means;

in respect of each output element, at least one of the sensors corresponds to that output element, and the computer is effective to set the on/off status of the output element in accordance with the setting of that corresponding sensor;

the apparatus includes means for stepping the display means sequentially through the output elements, and for selecting each output element in turn for display, sequentially, on the display means;

the arrangement of the apparatus is such that, as each element is selected for display, the display means is effective to identify the selected element, and is effective to display the setting of the corresponding sensor;

the arrangement of the apparatus is such that, when the setting of the corresponding sensor is on display, the apparatus is at that time then enabled to allow an operator to manually adjust the setting of the corresponding sensor by means of a keyboard.

2. Apparatus of claim 1, further characterised in that the visual display means has the capacity to display about forty alpha-numeric digits.

3. Apparatus of claim 1, further characterized in that:

the apparatus has from four to eight output elements, and the apparatus has from five to ten sensor input elements;

and at least one of the output elements has at least two corresponding sensor input elements.

4. Apparatus of claim 1, further characterised in that the total number of steps, upon stepping through all the output elements and all the corresponding sensor input elements, is between twenty and thirty.

5. Apparatus of claim 1, further characterised in that:

the apparatus includes a container, having a panel;

the display means and the keyboard are mounted on the panel;

the computer is physically integrated into the container;

the container is provided with means for effecting respective electrical connections to the several output and input elements.

6. Apparatus of claim 5, further characterised in that the apparatus is suitable for the simultaneous control of two cultivation facilities, being cultivation room A and room B, and the output and input elements of room A are substantially duplicated, in the container, in respect of room B, and the display means and the keyboard are operable in sequence in respect of both room A and room B.

\* \* \* \* \*